US009129581B2

(12) United States Patent
Yeh et al.

(10) Patent No.: US 9,129,581 B2
(45) Date of Patent: Sep. 8, 2015

(54) METHOD AND APPARATUS FOR DISPLAYING IMAGES

(71) Applicant: ASPEED Technology Inc., Hsinchu (TW)

(72) Inventors: Kuo-Wei Yeh, Hsinchu (TW); Chung-Yen Lu, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 315 days.

(21) Appl. No.: 13/669,762

(22) Filed: Nov. 6, 2012

(65) Prior Publication Data

US 2014/0125685 A1 May 8, 2014

(51) Int. Cl.

*G09G 5/399* (2006.01)
*G06F 13/00* (2006.01)
*G09G 5/393* (2006.01)

(52) U.S. Cl.

CPC ................ *G09G 5/393* (2013.01); *G09G 5/399* (2013.01); *G09G 2320/103* (2013.01)

(58) Field of Classification Search

CPC ......................... G06T 1/60; G09G 5/36–5/366
USPC .................................................. 345/530, 545
See application file for complete search history.

(56) References Cited

U.S. PATENT DOCUMENTS 5,061,919 A 10/1991 Watkins
5,300,948 A 4/1994 Tsujido et al.
5,543,824 A 8/1996 Priem et al.
5,629,723 A 5/1997 West et al.
7,394,465 B2 7/2008 Toni
7,460,725 B2 12/2008 Malladi et al.
2004/0075657 A1 4/2004 Chua
2008/0165478 A1 7/2008 McCoy
2009/0033670 A1* 2/2009 Hochmuth et al. ........... 345/545
2009/0225088 A1* 9/2009 Aoki ............................ 345/501
2010/0226441 A1 9/2010 Tung et al.
2011/0141123 A1 6/2011 Kumar et al.
2012/0113327 A1 5/2012 Li
2014/0125685 A1 5/2014 Yeh

FOREIGN PATENT DOCUMENTS

TW 201215148 A1 4/2012

OTHER PUBLICATIONS

"*Remote Desktop Protocol: RemoteFX Codec Extension*", Oct. 17, 2012, pp. 1-142; *2012 Microsoft Corporation.* MS-RDPRFX, Microsoft Technical Documents, <http://msdn.microsoft.com/en-us/library/jj712081(v=prot.20).aspx>.

(Continued)

*Primary Examiner* — Jacinta M Crawford

(74) *Attorney, Agent, or Firm* — Muncy, Geissler, Olds & Lowe, P.C.

(57) ABSTRACT

A method and apparatus for displaying images is disclosed. The method of the invention includes the steps of: transferring a content of a first one of the display buffers to the display device; overwriting a second one of the display buffers with first image data, wherein the first image data represent data of updated pixels between two corresponding adjacent frames; obtaining a bit-map mask according to the updated pixels, wherein the bit-map mask indicates altered pixels for the two corresponding adjacent frames; and, then overwriting the second one of the display buffers with second image data from the other display buffers according to at least one bit-map mask.

23 Claims, 12 Drawing Sheets

(56) References Cited

OTHER PUBLICATIONS

"*Remote Desktop Protocol: Graphics Pipeline Extension*", Oct. 17, 2012, pp. 1-110; *2012 Microsoft Corporation*. MS-RDPEGFX, <http://msdn.microsoft.com/en-us/library/jj712081(v=prot.20).aspx>.

"*Remote Desktop Protocol: Graphics Device Interface* (*GDI*) *Acceleration Extensions* ",Oct. 17, 2012, pp. 1-280; *2012 Microsoft Corporation*; MS-RDPEGDI, Microsoft Technical Documents< http://msdn.microsoft.com/en-us/library/jj712081(v=prot.20).aspx>.

"*Remote Desktop Protocol: Basic Connectivity and Graphics Remoting*" , Oct. 17, 2012, pp. 1-454; *2012 Microsoft Corporation* MS-RDPBCGR, Microsoft Technical Documents< http://msdn.microsoft.com/en-us/library/jj712081(v=prot.20).aspx>.

* cited by examiner

| | | |
|---|---|---|
| Frame composition command #1 (source=surface #1) | Dest_left | 0 |
| | Dest_top | 0 |
| | Dest_right | 3 |
| | Dest_bottom | 3 |
| Frame composition command #2 (source=surface #2) | Dest_left | 3 |
| | Dest_top | 3 |
| | Dest_right | 7 |
| | Dest_bottom | 5 |
| Frame composition command #3 (source=surface #3) | Dest_left | 2 |
| | Dest_top | 8 |
| | Dest_right | 7 |
| | Dest_bottom | 8 |

FIG. 2A column number row number

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 1 | 1 | 1 | 1 | 0 | 0 | 0 | 0 | 0 | 0 | 0 | 0 | 0 | |
| 1 | 1 | 1 | 1 | 1 | 0 | 0 | 0 | 0 | 0 | 0 | 0 | 0 | 0 | |
| 2 | 1 | 1 | 1 | 1 | 0 | 0 | 0 | 0 | 0 | 0 | 0 | 0 | 0 | |
| 3 | 1 | 1 | 1 | 1 | 1 | 1 | 1 | 1 | 0 | 0 | 0 | 0 | 0 | |
| 4 | 0 | 0 | 0 | 1 | 1 | 1 | 1 | 1 | 0 | 0 | 0 | 0 | 0 | |
| 5 | 0 | 0 | 0 | 1 | 1 | 1 | 1 | 1 | 0 | 0 | 0 | 0 | 0 | |
| 6 | 0 | 0 | 0 | 0 | 0 | 0 | 0 | 0 | 0 | 0 | 0 | 0 | 0 | |
| 7 | 0 | 0 | 0 | 0 | 0 | 0 | 0 | 0 | 0 | 0 | 0 | 0 | 0 | |
| 8 | 0 | 0 | 1 | 1 | 1 | 1 | 1 | 1 | 0 | 0 | 0 | 0 | 0 | |
| 9 | 0 | 0 | 0 | 0 | 0 | 0 | 0 | 0 | 0 | 0 | 0 | 0 | 0 | |
| 8 | 0 | 0 | 0 | 0 | 0 | 0 | 0 | 0 | 0 | 0 | 0 | 0 | 0 | |
| 10 | 0 | 0 | 0 | 0 | 0 | 0 | 0 | 0 | 0 | 0 | 0 | 0 | 0 | |
| 11 | 0 | 0 | 0 | 0 | 0 | 0 | 0 | 0 | 0 | 0 | 0 | 0 | 0 | |
| 12 | 0 | 0 | 0 | 0 | 0 | 0 | 0 | 0 | 0 | 0 | 0 | 0 | 0 | |
| 13 | | | | | | | | | | | | | | |

mask value frame mask map *n*

FIG. 2B one frame mask map

| current mask value | pixel type | data transfer path |
|---|---|---|
| 0 | unaltered | move data from previous frame buffer to current frame buffer |
| 1 | altered | move data from source buffer to back buffer |

FIG. 2C two frame mask maps

| current mask value | previous mask value | pixel type | data transfer path |
|---|---|---|---|
| 0 | 0 | A | no data transfer occurs |
| 0 | 1 | C | move data from previous frame buffer to current frame buffer |
| 1 | X | B | move data from source buffer to back buffer |

"X" denotes a don't-care value

FIG. 2F three frame mask maps

| current mask value | previous-1 mask value | previous-2 mask value | pixel type | data transfer path |
|---|---|---|---|---|
| 0 | 0 | 0 | A | no data transfer occurs |
| 0 | 0 | 1 | C2 | move data from previous-2 frame buffer *n-2* to current frame buffer *n* |
| 0 | 1 | X | C1 | move data from previous-1 frame buffer *n-1* to current frame buffer *n* |
| 1 | X | X | B | move data from source buffer to current frame buffer *n* |

"X" denotes a don't-care value

FIG. 2G

METHOD AND APPARATUS FOR DISPLAYING IMAGES

This application is related to co-pending application Ser. No. 14/473,607, filed Aug. 29, 2014 and to co-pending application Ser. No. 14/508,851, filed Oct. 7, 2014.

BACKGROUND OF THE INVENTION

1. Field of the invention

This invention relates to image generation, and more particularly, to a method and system for effectively displaying images.

2. Description of the Related Art

MS-RDPRFX (short for "Remote Desktop Protocol: RemoteFX Codec Extension", Microsoft's MSDN library documentation), U.S. Pat. No. 7,460,725, US Pub. No. 2011/0141123 and US Pub. No. 2010/0226441 disclose a system and method for encoding and decoding electronic information. A tiling module of the encoding system divides source image data into data tiles. A frame differencing module compares the current source image, on a tile-by-tile basis, with similarly-located comparison tiles from a previous frame of input image data. To reduce the total number of tiles that requires encoding, the frame differencing module outputs only those altered tiles from the current source image that are different from corresponding comparison tiles in the previous frame. A frame reconstructor of a decoding system performs a frame reconstruction procedure to generate a current decoded frame that is populated with the altered tiles and with remaining unaltered tiles from a prior frame of decoded image data. Referring to the FIG. 1, the hatched portion Dp represents a different region between a current frame n and a previous frame n-1. The encoder examines the different region Dp and determines the set of tiles that correspond to those different regions Dp. In this example, tiles 2-3, 6-8 and 10-12 are altered tiles.

Microsoft's MSDN library documentation, such as Remote Desktop Protocol: Graphics Pipeline Extension (MS-RDPEGFX), Graphics Device Interface Acceleration Extensions (MS-RDPEGDI) and Basic Connectivity and Graphics Remoting Specification (MS-RDPBCGR), discloses a Graphics Remoting system. The data can be sent on the wire, received, decoded, and rendered by a compatible client. In this Graphics Remoting system, bitmaps are transferred from the server to an offscreen surface on the client, bitmaps are transferred between offscreen surfaces, bitmaps are transferred between offscreen surfaces and a bitmap cache, and a rectangular region is filled on an offscreen surface with a predefine color. For example, the system uses a special frame composition command "RDPGFX_MAP_SURFACE_TO_OUTPUT_PDU message" to instruct the client to BitBlit or Blit a surface to a rectangular area of the graphics output buffer (also called "shadow buffer" or "offscreen buffer" or "back buffer") for displaying. After the graphics output buffer has been reconstructed completely, the whole frame image data are moved from the graphics output buffer to primary buffer (also called "front buffer") for displaying (hereinafter called "single buffer structure").

In the conventional single buffer architecture, the memory access includes operations of: (a) writing decoded data to a temporary buffer by a decoder, (b) then moving decoded data from the temporary buffer to the shadow surface (back buffer), (c) then moving full frame image content from the shadow surface to the primary surface for displaying. The shadow surface contains full frame image content of a previous frame in the single buffer architecture. Therefore, only the altered image region which contains image data of difference between a current frame and a previous frame needs to be moved from the temporary buffer to the shadow surface. After altered image data have been moved to the shadow surface, the full content of the shadow surface must be moved to the primary surface (front buffer or output buffer) for displaying. Thus, since the single buffer architecture needs a large amount of memory access, the system performance is dramatically reduced.

A major problem with this single buffer architecture is screen tearing. Screen tearing is a visual artifact where information from two or more different frames is shown in a display device in a single screen draw. For high resolution image, there is no enough time to move frame image content from the shadow surface (offscreen surface) to the primary surface in vertical retrace interval of display device. The most common solution to prevent screen tearing is to use multiple frame buffering, e.g. Double-buffering. At any one time, one buffer (front buffer or primary surface) is being scanned for displaying while the other (back buffer or shadow surface) is being drawn. While the front buffer is being displayed, a completely separate part of back buffer is being filled with data for the next frame. Once the back buffer is filled, the front buffer is instructed to look at the back buffer instead. The front buffer becomes the back buffer, and the back buffer becomes the front buffer. This swap is usually done during the vertical retrace interval of the display device to prevent the screen from "tearing".

SUMMARY OF THE INVENTION

In view of the above-mentioned problems, an object of the invention is to provide a method for effectively displaying images without visual artifact.

One embodiment of the invention provides a method for displaying images. The method is applied to an image display system comprising a display device and a plurality of display buffers. The method comprises the steps of: transferring a content of a first one of the display buffers to the display device; overwriting a second one of the display buffers with first image data, wherein the first image data represent data of updated pixels between two corresponding adjacent frames; obtaining a bit-map mask according to the updated pixels, wherein the bit-map mask indicates altered pixels for the two corresponding adjacent frames; and, then overwriting the second one of the display buffers with second image data from the other display buffers according to at least one bit-map mask.

Another embodiment of the invention provides an apparatus for displaying images. The apparatus is applied to an image display system comprising a display device. The apparatus comprises: a plurality of display buffers, a display unit, an update unit, a mask generation unit and a display compensate unit. The display buffers are used to store image data. The display unit transfers a content of a first one of the display buffers to the display device. The update unit overwrites a second one of the display buffers with first image data, wherein the first image data represent data of updated pixels between two corresponding adjacent frames. The mask generation unit generates a bit-map mask according to the updated pixels, wherein the bit-map mask indicates altered pixels for two corresponding adjacent frames. The display compensate unit overwrites the second one of the display buffers with second image data from the other display buffers according to at least one bit-map mask. The display control unit causes the display unit to transfer the content of the first one of the display buffers to the display device.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2A shows three exemplary frame composition commands associated with two adjacent frames.

FIG. 2B shows a portion of an exemplary frame mask map associated with the three frame composition commands of FIG. 2A.

FIG. 2C is a diagram showing a relationship between mask values and data transfer path based on one frame mask map and a multiple-buffering architecture.

FIG. 2F shows three pixel types representing the combination result of the two adjacent frame mask maps of FIG. 2E.

FIG. 2G is a diagram showing a relationship between mask values and data transfer paths based on three frame mask maps.

DETAILED DESCRIPTION OF THE INVENTION

Figure 1:
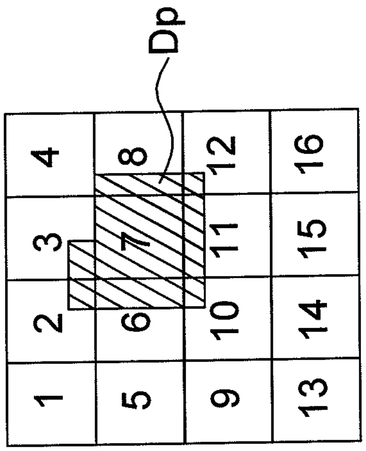
FIG. 1 illustrates an example of a frame difference between a current frame and a previous frame.

As used herein and in the claims, the term "source buffer" refers to any memory device that has a specific address in a memory address space of an image display system. As used herein, the term "a," "an," "the" and similar terms used in the context of the present invention (especially in the context of the claims) are to be construed to cover both the singular and plural unless otherwise indicated herein or clearly contradicted by the context.

The present invention adopts a frame mask map mechanism for determining inconsistent regions between several adjacent frame buffers. A feature of the invention is the use of a multiple-buffering architecture and at least one frame mask map to reduce data transfer from a previous frame buffer to a current frame buffer (back buffer), thereby to speed up the image reconstruction.

Generally, frame composition commands have similar formats. For example, a BitBlt (called "Bit Blit") command performs a bit-block transfer of the color data corresponding to a rectangle of pixels from a source device context into a destination device context. The BitBlt command has the following format: BitBlt(hdcDest, XDest, YDest, Width, Height, hdcSrc, XSrc, YSrc, dwRop), where hdcDest denotes a handle to the destination device context, XDest and YDest denote the x-coordinate and y-coordinate of the upper-left corner of the destination rectangle, Width and Height denote the width and the height of the source and destination rectangles, hdcSrc denotes a handle to the source device context, and XSrc and YSrc denote the x-coordinate and y-coordinate of the upper-left corner of the source rectangle. Likewise, each frame composition command contains a source handle pointing to the source device context and four destination parameters (Dest_left, Dest_top, Dest_right and Dest_bottom) defining a rectangular region in an output frame buffer (destination buffer or back buffer).

FIG. 2A shows three exemplary frame composition commands associated with two adjacent frames. In the example of FIG. 2A, the union of the three frame composition commands represents altered regions between the current frame n and the previous frame n-1. FIG. 2B shows a portion of an exemplary frame mask map n associated with the three frame composition commands of FIG. 2A. The three frame composition commands of FIG. 2A are decoded converted into a frame mask map n of the FIG. 2B by a mask generation unit 350 (which will be described below in connection with FIG. 3A). Referring to FIG. 2B, in the frame mask map n, each pixel position is marked with one of two signs (1 or 0), indicating whether the pixel value at the corresponding position of the current frame n and the previous frame n-1 is altered. Mask values of 1 and 0 are respectively inserted at the corresponding pixel positions whose pixel values are altered and unaltered in the frame mask map n. FIG. 2C is a diagram showing a relationship between mask values and data transfer path based on one frame mask map and a multiple-buffering architecture. When the pixel positions are marked with a mask value of 1 (its pixel type is defined as "altered") in the frame mask map n, the corresponding pixel values have to be moved from a designated source buffer to the back buffer according to the frame composition commands during a frame reconstruction process. When the pixel positions are marked with a mask value of 0 (its data type is defined as "unaltered") in the frame mask map n, the corresponding pixel values have to be moved from a previous frame buffer to the back buffer during the frame reconstruction process.

Figure 2D:
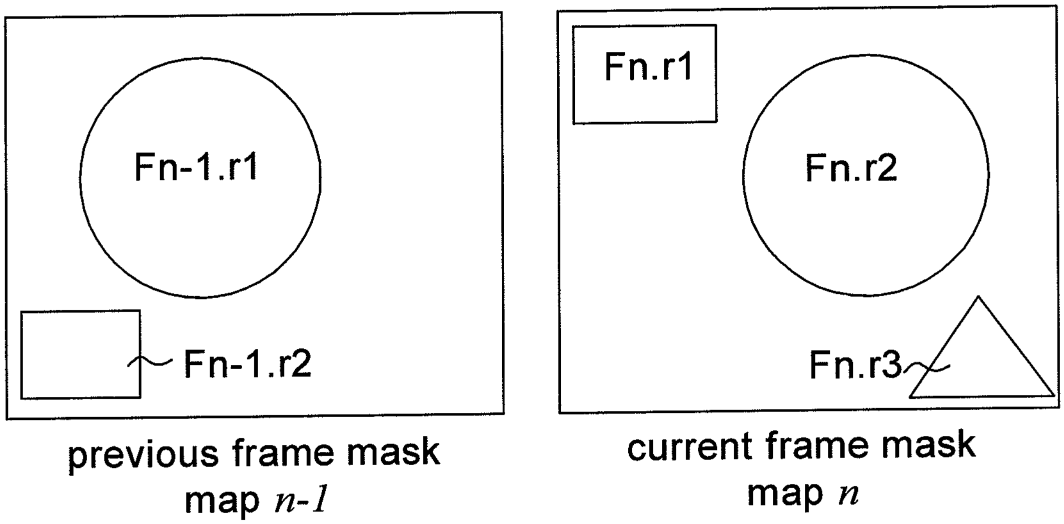
FIG. 2D illustrates two exemplary frame mask maps according to an embodiment of the invention.
Figure 2E:
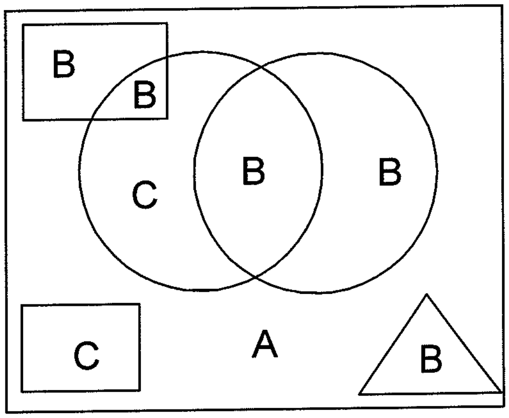
FIG. 2E illustrates a combination result of two adjacent frame mask maps n and n-1 of FIG. 2D.

FIG. 2D illustrates two exemplary frame mask maps according to an embodiment of the invention. In a current frame mask map n, three altered regions (Fn.r1, Fn.r2 and Fn.r3) are marked based on the current frame n and the previous frame n-1 while in a previous frame mask map n-1, two altered regions (Fn-1.r1 and Fn-1.r2) are marked based on the previous frames n-1 and n-2. FIG. 2E illustrates a combination result of two adjacent frame mask maps n and n-1 of FIG. 2D.

During a frame reconstruction process, the current frame mask map n and the previous frame mask map n-1 are combined to determine which image region needs to be moved from a previous frame buffer to a current frame buffer (i.e., the back buffer). FIG. 2F shows three pixel types for the combination result of the two adjacent frame mask maps of FIG. 2E. Referring to FIG. 2F, the combination result of the two frame mask maps n and n-1 can be divided into three pixel types: A, B and C. Type A refers to an unaltered image region (a current mask value of 0 and a previous mask value of 0 are respectively marked at the same positions of the current frame mask map n and the previous frame mask map n-1) between the two frames n and n-1. It indicates that the pixel data in “type A” region are consistent in the current frame n and the previous frame n-1 and thus no data transfer operation needs to be performed during the frame reconstruction process. Type C refers to an image region (a current mask value of 0 and a previous mask value of 1 are respectively marked at the same positions of the current frame mask map n and the previous frame mask map n-1), each pixel data of which is altered in the previous frame n-1 and unaltered in the current frame n. It indicates that the pixel data in “type C” region are not consistent between the current frame n and the previous frame buffer n-1 and thus need to be copied from the previous frame buffer to the current frame buffer during the frame reconstruction process. Type B refers to an image region (a current mask value of 1 is marked at the same positions of the current frame mask map n), each pixel data of which is altered in the current frame n. Therefore, the pixel data in the “type B” region have to be moved from the source buffer to the current frame buffer according to the frame composition commands during the frame reconstruction process.

FIG. 2G is a diagram showing a relationship between mask values and data transfer paths based on a triple-buffering architecture and three frame mask maps. During a frame reconstruction process, the current frame mask map n and the previous frame mask maps n-1 and n-2 are combined to determine which image region needs to be moved from a previous frame buffer n-1 to a current frame buffer (i.e., the back buffer) n and from a previous frame buffers n-2 to the current frame buffer n.

Referring to FIG. 2G, the combination result of the three frame mask maps n, n-1 and n-2 can be divided into four types: A, B, C1 and C2. Type A and B have the similar definitions as those in FIG. 2F and thus their descriptions are omitted herein. Type C1 refers to an image region (a current mask value of 0 and a previous mask value of 1 are respectively marked at the same positions of the current frame mask map n and the immediately previous frame mask map n-1), each pixel data of which is altered in the immediately previous frame n-1 and unaltered in the current frame n. It indicates that the pixel data in “type C1” region are not consistent in the current frame n and the previous frame buffer n-1 and thus need to be copied from the previous frame buffer n-1 to the current frame buffer n during the frame reconstruction process. Type C2 refers to an image region (a current mask value of 0 and two previous mask values of 0 and 1 are respectively marked at the same positions of the current frame mask map n and the immediately previous two frame mask maps n-1 and n-2), each pixel data of which is altered in the previous frame n-2 and unaltered in the frames n and n-1. It indicates that the pixel data in “type C2” region are not consistent between the current frame n and the previous frame buffer n-2 and thus need to be copied from the previous frame buffer n-2 to the current frame buffer n during the frame reconstruction process.

Figure 3A:
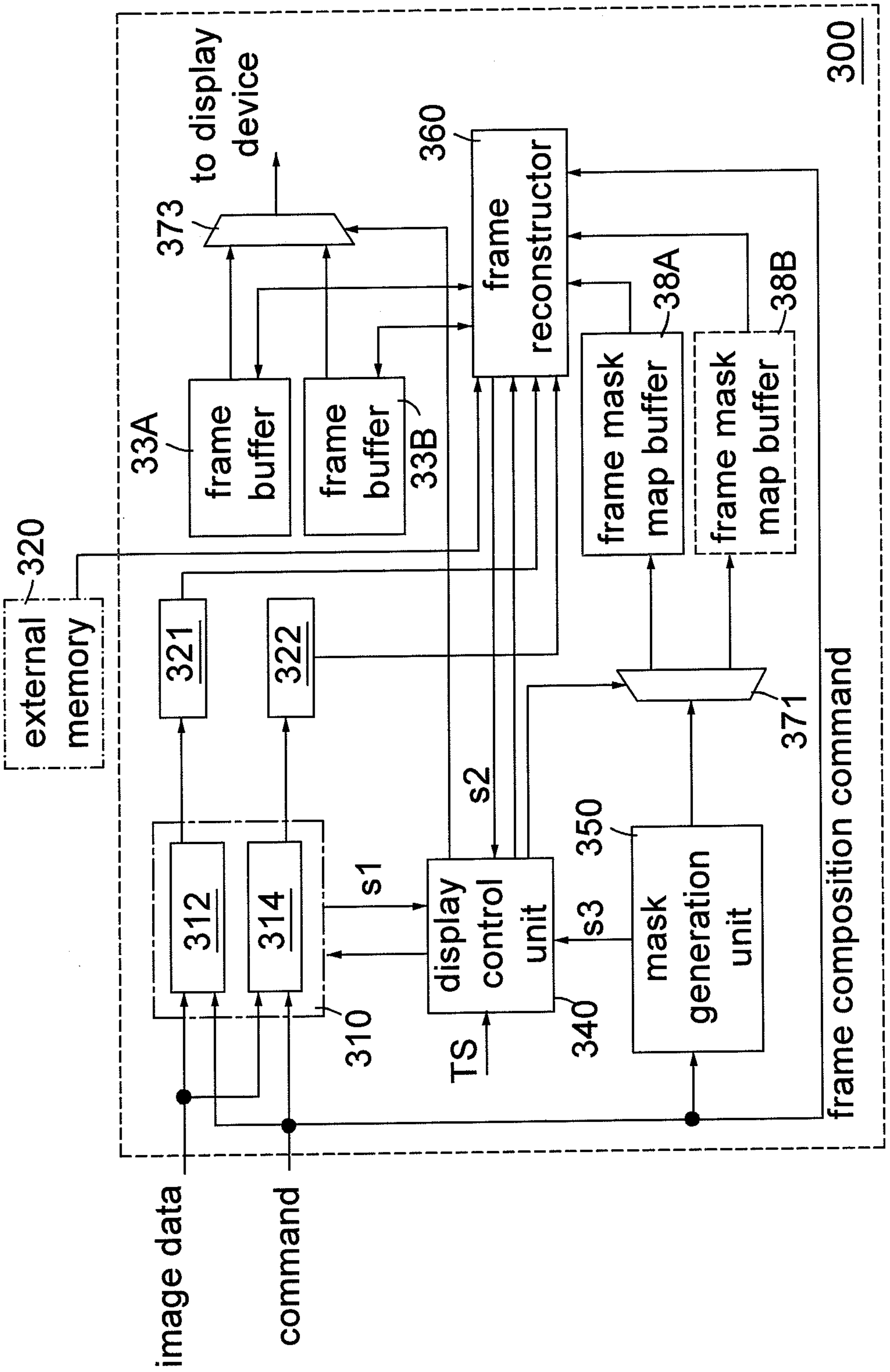
FIG. 3A is a schematic diagram of apparatus for displaying images according to an embodiment of the invention.

FIG. 3A is a schematic diagram of apparatus for displaying images according to an embodiment of the invention. An apparatus 300 of FIG. 3A is provided based on a double-buffering architecture and two frame mask map mechanism. However, the double-buffering architecture and two frame mask map mechanism are provided by way of explanation and not limitations of the invention. In the actual implementation, multiple frame buffers with one or multiple frame mask map mechanism also fall in the scope of the invention.

Referring now to FIG. 3A, the apparatus 300 of the invention, applied to an image display system (not shown), includes a rendering engine 310, two temporary buffers 321 and 322, two frame buffers 33A and 33B, a display control unit 340, a mask generation unit 350, two frame mask map buffers 38A and 38B, a frame constructor 360 and two multiplexers 371 and 373. The rendering engine 310 receives the incoming image data and commands to render an output image into the temporary buffers 321 and 322. The rendering engine 310 includes but is not limited to: a 2D graphics engine, a 3D graphics engine and a decoder (capable of decoding various image formats, such as JPEG and BMP). The number of the temporary buffers depends on the functions of the rendering engine 310. In the embodiment of FIG. 3A, the rendering engine 310 includes a 2D graphics engine 312 and a JPEG decoder 314, respectively corresponding to two temporary buffers 321 and 322. The 2D graphics engine 312 receives incoming image data and a 2D command (such as filling a specific rectangle with blue color) and then renders a painted image into the temporary buffer 321. The JPEG decoder 314 receives encoded image data and a decode command, performs decoding operations and renders a decoded image into the temporary buffer 322. The rendering engine 310 generates a status signal s1, indicating whether rendering engine 310 completes operations. For example, when the status signal s1 has a value of 0, it represents that the rendering engine 310 is performing rendering operations; when s1 has a value of 1, it represents that the rendering engine 310 completes the rendering operations. Likewise, the frame reconstructor 360 generates a status signal s2, indicating whether the frame reconstruction process is completed. The mask generation unit 350 generates a status signal s3, indicating whether the frame mask map generation is completed.

As described above in connection with FIGS. 2A and 2B, the mask generation unit 350 generates a current frame mask map for a current frame n and writes it into a current frame mask map buffer (38A or 38B) in accordance with the incoming frame composition commands. In accordance with the display timing signal TS and three status signals s1-s3, the display control unit 340 updates a reconstructor buffer index for double buffering control (i.e., swapping the back buffer and the front buffer). Here, a display device provides the display timing signal TS, for example but not limited to, a vertical synchronization (VS) signal from the display device of the image display system. Alternatively, the display timing signal TS may contain the information about the number of scanned lines that is already scanned from the front buffer to the display device. The reconstructor buffer index includes but is not limited to: an external memory base address, the two temporary buffer base addresses, the current frame buffer index, a previous frame buffer index, the current frame mask map index and a previous frame mask map index. The two temporary buffer base addresses are the base addresses of the two temporary buffers 321 and 322. The current and the previous frame mask map indexes respectively indicate which frame mask buffer contain the current and the previous frame mask maps. The current and the previous frame buffer indexes respectively indicate which frame buffer is being scanned to the display device and which frame buffer is being written. In response to the incoming frame composition commands, the frame reconstructor 360 first moves image data (type B) of altered regions from at least one source buffer (including but not limited to: the temporary buffers 321 and 322 and the external memory 320) to the current frame buffer (back buffer). Next, after accessing and combining the current frame mask map n and previous frame mask map n-1 to determine which image region belongs to the “type C” region, the frame reconstructor 360 moves the corresponding image data from the previous frame buffer to the current frame buffer. After a rendering process, a frame mask generation process and a frame reconstruction process are completed, a double buffering swap is carried out during a vertical retrace interval of the display device of the image display system. The vertical retrace interval of display device is generated in accordance with the display timing signal (e.g., the VS signal). Here, the external memory 320 refers to any memory device located outside the apparatus 300.

Figure 3B:
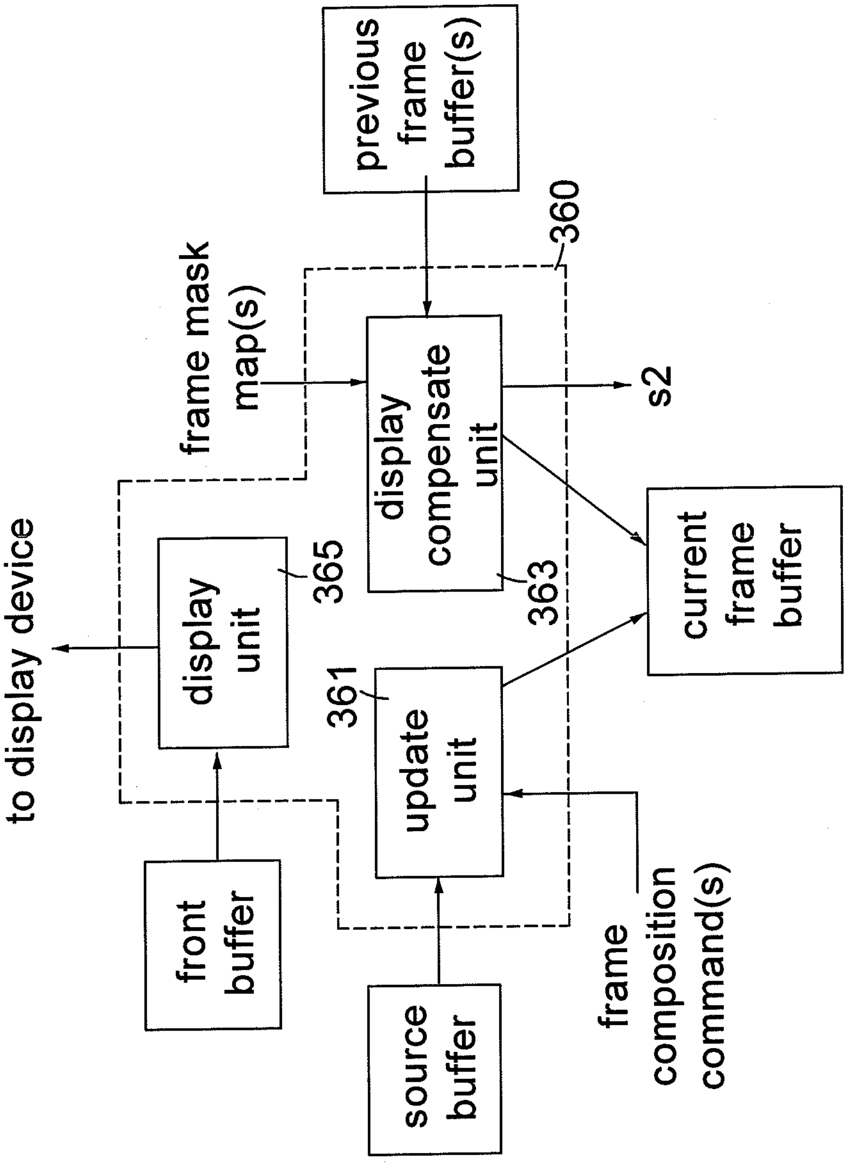
FIG. 3B is a schematic diagram of the frame reconstructor of FIG. 3A according to an embodiment of the invention.

FIG. 3B is a schematic diagram of the frame reconstructor of FIG. 3A according to an embodiment of the invention. Referring to FIG. 3B, the frame reconstructor 360 includes an update unit 361, a display compensate unit 363 and a display unit 365. The display unit 365 transfers the full content of the front buffer to the display device of the image display system. Since the embodiment of FIG. 3A is based on a double-buffering architecture, the front buffer is equivalent to the previous frame buffer. The update unit 361 firstly transfers data of type B from at least one designated source buffer to a current frame buffer according to corresponding frame composition commands. Then, the display compensate unit 363 copies data of type C from the previous buffer to the current frame buffer according to corresponding frame mask maps, without moving data of type A from the previous buffer to the current frame buffer. Accordingly, the use of the display compensate unit 363 significantly reduces data access between the previous frame buffer and the current frame buffer.

Figure 4:
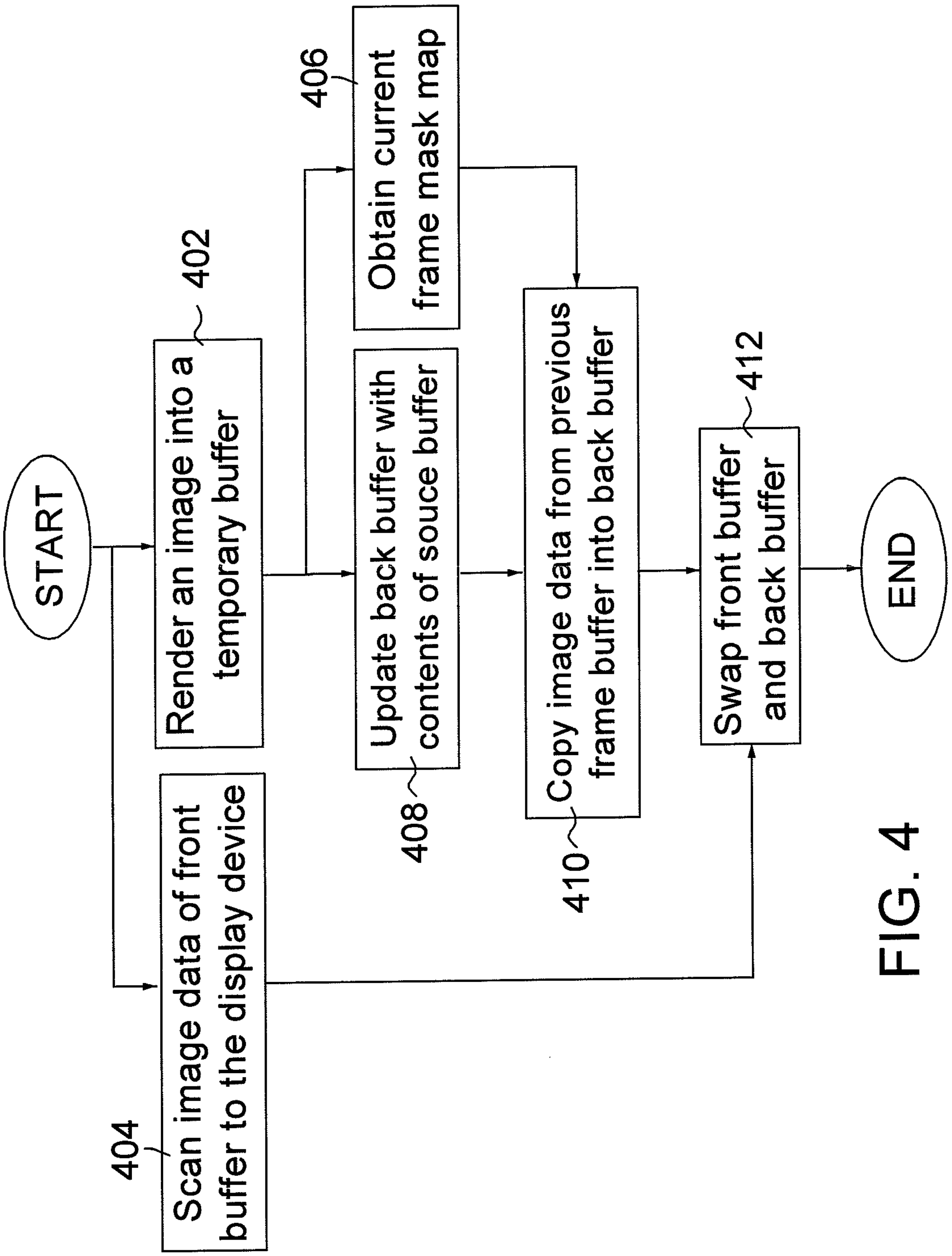
FIG. 4 is a flow chart showing a method for display images according to an embodiment of the invention.

FIG. 4 is a flow chart showing a method for display images according to an embodiment of the invention. Based on a double-buffering architecture in conjunction with two frame mask maps, the method of the invention, applied to the image display system, is described below with reference to FIGS. 3A and 3B.

Step S402: Render an image into a temporary buffer or an external memory. For example, the 2D graphics engine 312 may receive incoming image data and a 2D command (such as filling a specific rectangle with blue color) and renders a painted image into the temporary buffer 321; the JPEG decoder 314 may receive encoded image data and a decode command, performs decoding operations and renders a decoded image into the temporary buffer 322; a specific image is written to the external memory 320. Once the rendering process has been completely written, the rendering engine 310 sets the status signal s1 to 1, indicating the rendering process is completed.

Step S404: Scan the contents of the front buffer to the display device. Assume that a previously written complete frame is stored in the front buffer. The display unit 365 transfers the contents of the front buffer to the display device of the image display system. Since this embodiment is based on a double-buffering architecture, the front buffer is equivalent to the previous frame buffer. The image data of the front buffer are being scanned to the display device at the same time that new data are being written into the back buffer. The writing process and the scanning process begin at the same time, but may end at different time. In one embodiment, assume that the total number of all scan lines is equal to 1080. If the display device generates the display timing signal TS containing the information that the number of already scanned lines is equal to 900, it indicates the scanning process keeps going on. Contrarily, when the display device generates the display timing signal indicating that the number of already scanned lines is equal to 1080, it represents the scanning process is completed. In an alternative embodiment, the display timing signal TS is equivalent to the VS signal. When a corresponding vertical synchronization pulse is received, it indicates the scanning process is completed.

Step S406: Obtain a current frame mask map n according to frame composition commands. The mask generation unit 350 generates a current frame mask map n and writes it to a current frame mask map buffer (38A or 38B) in accordance with the incoming frame composition commands, for example but not limited to, "bitblt" commands. Once the current frame mask map n has been generated, the mask generation unit 350 sets the status signal s3 to 1, indicating the frame mask map generation is completed.

Step S408: Update a back buffer with contents of the source buffer according to the frame composition commands. According to the frame composition commands, the update unit 361 moves image data (type B) from the source buffer (including but not limited to the temporary buffer 321 and 322 and the external memory 320) to the back buffer.

Step S410: Copy image data from the previous frame buffer to the back buffer. After the update unit 361 completes updating operations, the display compensate unit 363 copies image data (type C) from the previous frame buffer to the back buffer according to the two frame mask maps n and n-1. As to the "type A" regions, since they are consistent regions between the current frame buffer and previous frame buffer, no data transfer need to be performed. Once the back buffer has been completely written, the display compensate unit 363 sets the status signal s2 to 1, indicating the frame reconstruction process is completed.

Step S412: Swap the back buffer and the front buffer. The display control unit 340 constantly monitors the three status signals s1-s3 and the display timing signal TS. According to the display timing signal TS (e.g., the VS signal or containing the number of already scanned lines) and the three status signals s1-s3, the display control unit 340 determines whether to swap the back buffer and the front buffer. In a case that all the three status signals s1-s3 are equal to 1 (indicating the rendering process, the frame mask generation and the frame reconstruction are completed) and the display timing signal indicates the scanning process is completed, the display control unit 340 updates the reconstructor buffer index (including but not limited to: an external memory base address, the two temporary buffer base addresses, the current frame buffer index, a previous frame buffer index, the current frame mask map index and a previous frame mask map index) to swap the back buffer and the front buffer during a vertical retrace interval of the display device of the image display system. Contrarily, in a case that at least one of the three status signals and the display timing signal indicates at least one corresponding process is not completed, the display control unit 340 does not update the reconstructor buffer index until all the four processes are completed. For example, if only the status signal s2 maintains at the value of 0 (indicating the frame reconstruction is not completed), the display control unit 340 does not update the reconstructor buffer index until the frame reconstructor 360 completes the frame reconstruction.

Figure 5:
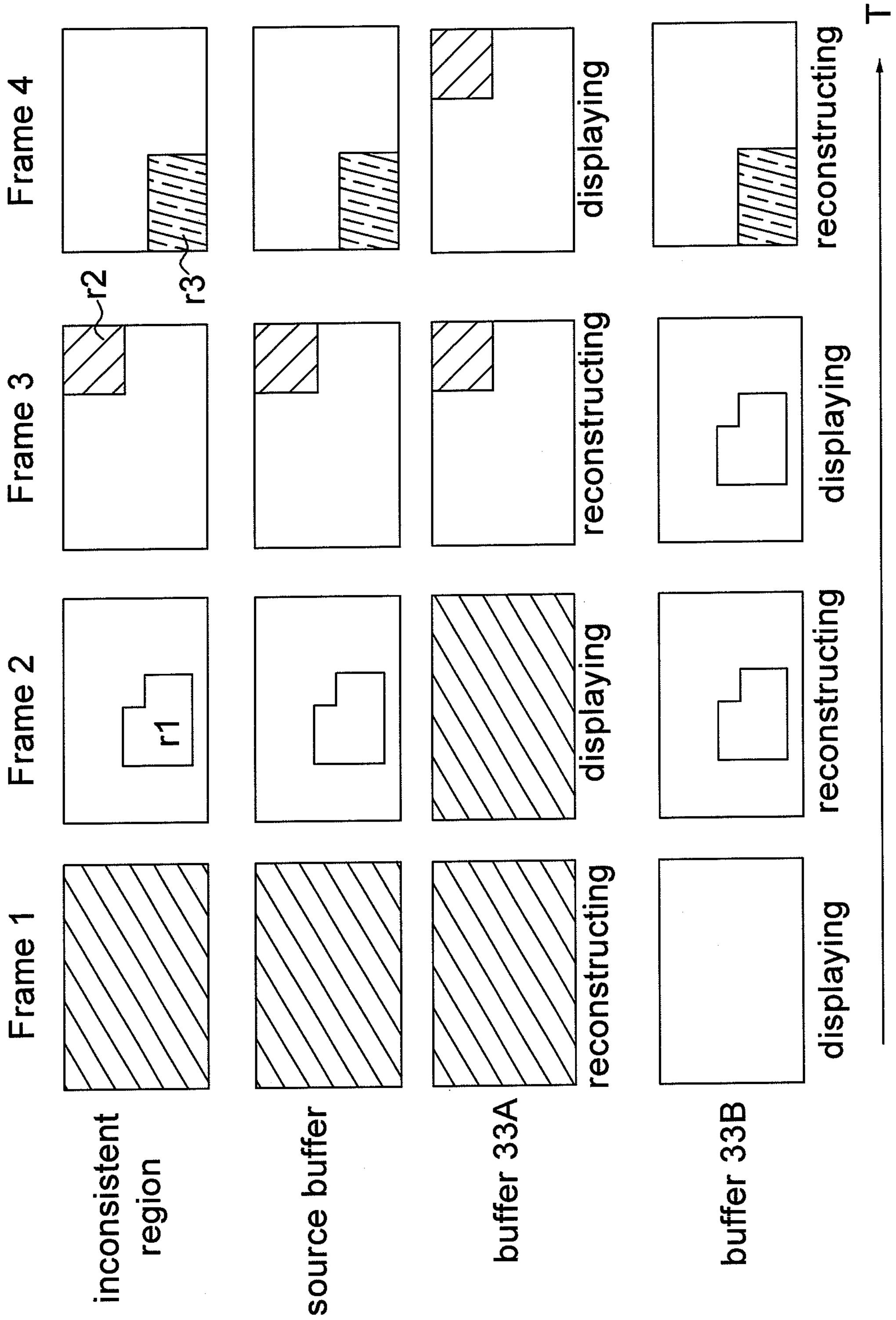
FIG. 5 shows a first exemplary frame reconstruction sequence based on a double-buffering architecture and one frame mask map.

FIG. 5 shows a first exemplary frame reconstruction sequence based on a double-buffering architecture and one frame mask map. The first exemplary frame reconstruction sequence is detailed with reference to FIGS. 3A and 2C. Please note that since there is only one frame mask map used in the embodiment of FIG. 5, the apparatus 300 may operate with only one frame mask map buffer 38A. In that case, the frame mask map buffer 38B may be disregarded and thus represented in dotted line.

Referring to FIG. 5, the apparatus 300 renders image data to reconstruct full frame image data during Frame 1. Because the frame buffer 33A is initially empty, it starts with moving all image data from a source buffer (including but not limited to the temporary buffers 321 and 322 and the external memory 320) to the frame buffer 33A. After Frame 1 has been reconstructed, two frame buffers 33A and 33B are swapped during the vertical retrace interval of the display device so that the frame buffer 33A becomes the front buffer and the frame buffer 33B becomes the back buffer.

Next, assume that the rendering engine 310 renders an altered region r1 representing an inconsistent region between Frame 1 and Frame 2 into the temporary buffer 321. To reconstruct a full frame image, the frame reconstructor 360 moves image data of altered region r1 (i.e., the white hexagon r1 having a current mask value of 1 according to FIG. 2C) from the temporary buffer 321 to the back buffer 33B according to corresponding frame composition commands and then moves the image data of unaltered region (i.e., the hatched region outside the white hexagon r1 and having a current mask value of 0 according to FIG. 2C) from the front buffer 33A to the back buffer 33B according to a current frame mask map 2. After Frame 2 has been reconstructed, two frame buffers 33A and 33B are swapped again during the vertical retrace interval of the display device so that the frame buffer 33B becomes the front buffer and the frame buffer 33A becomes the back buffer.

During the frame reconstruction period of Frame 3, assume that the decoder 314 decodes an altered region r2 and updates the temporary buffer 322 with decoded image data. To reconstruct a full frame image, the frame reconstructor 360 moves image data of the altered region r2 (having a current mask value of 1 according to FIG. 2C) from the temporary buffer 322 to the back buffer 33A according to corresponding frame composition commands and then moves image data of the unaltered region (having a current mask value of 0 according to FIG. 2C) from the front buffer 33B to the back buffer 33A according to a current frame mask map 3. After Frame 3 has been reconstructed, two frame buffers 33A and 33B are swapped again during the vertical retrace interval of the display device so that the frame buffer 33A becomes the front buffer and the frame buffer 33B becomes the back buffer. The following frame reconstruction sequence is repeated in the same manner. However, since one frame mask map is used, a large amount of unaltered data needs to be moved from the previous frame buffer to the current frame buffer during frame reconstruction process, thereby resulting in a huge memory access overhead. To solve the above problem, a second exemplary frame reconstruction sequence based on two frame mask maps is provided below.

Figure 6:
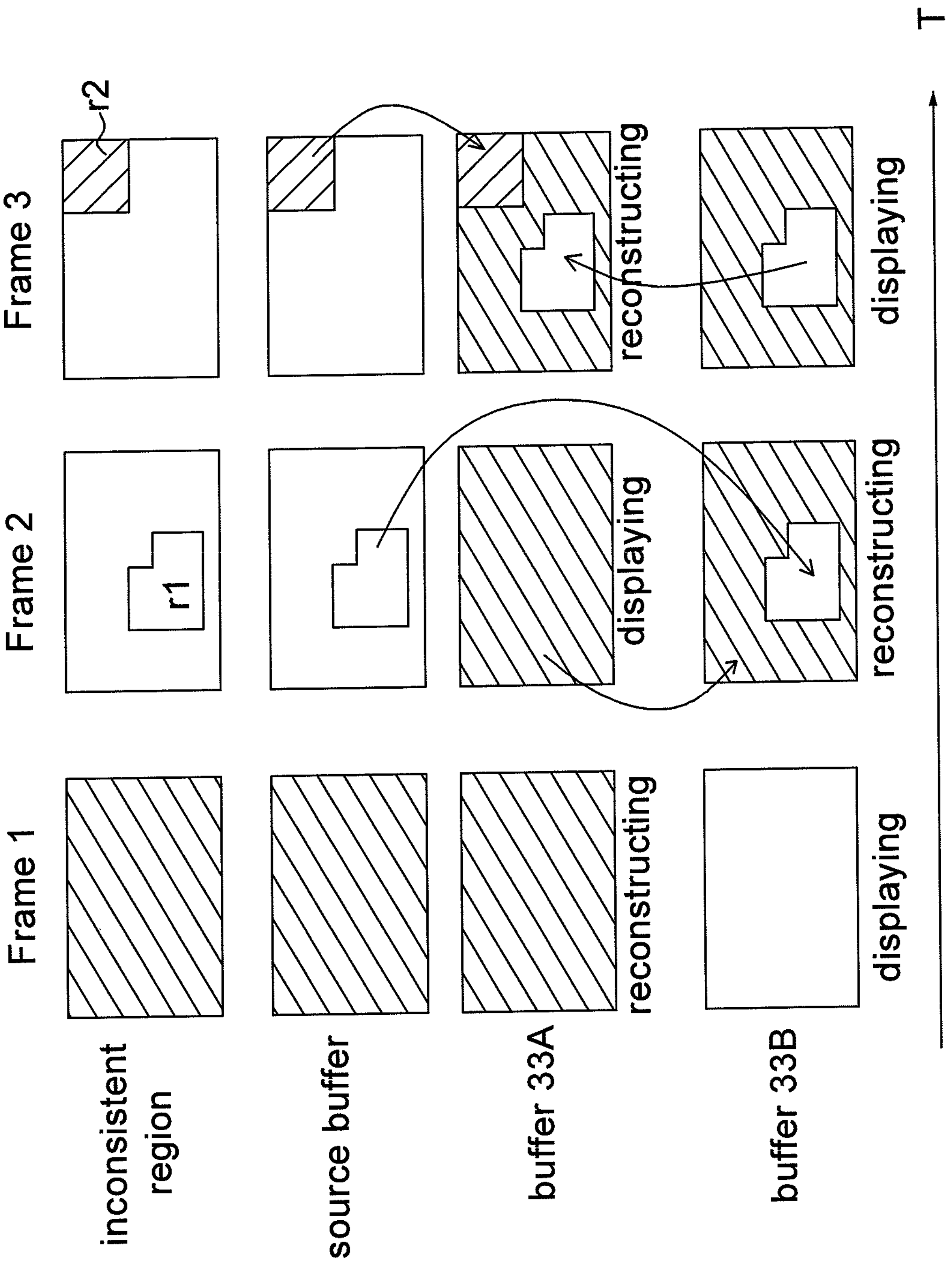
FIG. 6 shows a second exemplary frame reconstruction sequence based on a double-buffering architecture and two frame mask maps.

FIG. 6 shows a second exemplary frame reconstruction sequence based on a double-buffering architecture and two frame mask maps. The second exemplary frame reconstruction sequence is detailed with reference to FIGS. 2F and 3A.

Referring to FIG. 6, the apparatus 300 renders image data to reconstruct full frame image data during Frame 1. Because the frame buffer 33A is initially empty, it starts with moving all image data from the source buffer to the frame buffer 33A. After Frame 1 has been reconstructed, two frame buffers are swapped during the vertical retrace interval of the display device so that the frame buffer 33A becomes the front buffer and the frame buffer 33B becomes the back buffer.

Next, assume that the external memory 320 is written with an altered region r1 representing an inconsistent region between Frame 1 and Frame 2. To reconstruct a full frame image, the frame reconstructor 360 moves image data of altered region r1 (i.e., the white hexagon r1) from the external memory 320 to the back buffer 33B according to corresponding frame composition commands and then moves the image data of unaltered region (i.e., the hatched region outside the hexagon r1) from the front buffer 33A to the back buffer 33B according to a current frame mask map 2. After Frame 2 has been reconstructed, two frame buffers are swapped again during the vertical retrace interval of the display device so that the frame buffer 33B becomes the front buffer and the frame buffer 33A becomes the back buffer.

During the frame reconstruction period of Frame 3, the rendering engine 310 renders an altered region r2 representing an inconsistent region between Frame 2 and Frame 3 into the source buffer. According to the invention, inconsistent regions among three adjacent frames can be determined in view of two adjacent frame mask maps. Thus, to reconstruct a full frame image, after moving image data of the altered region r2 (type B) from the source buffer to the back buffer 33A according to corresponding frame composition commands, the frame reconstructor 360 only copies inconsistent image data (type C) from the front buffer 33B to the back buffer 33A according to two frame mask maps 3 and 2, without copying consistent image data (type A). In comparison with FIG. 5, writing consistent data between frame buffers is avoided in FIG. 6 and thus memory access is reduced significantly.

Likewise, the present invention can be applied to more than two frame buffers, for example but not limited to a triple frame buffering architecture (having three frame buffers) and a quad frame buffering architecture (having four frame buffers). It is noted that the number Y of the frame mask maps is less than or equal to the number X of frame buffers, i.e., X>=Y. For example, the triple frame buffering architecture may operate in conjunction with one, two or three frame mask maps; the quad frame buffering architecture may operate in conjunction with one, two, three or four frame mask maps. In addition, the number P of the frame mask map buffers is greater than or equal to the number Y of the frame mask maps i.e., P>=Y.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for displaying images, applied to an image decoding and display system comprising a local display device and a plurality of display buffers, the method comprising:

transferring a content of a first one of the display buffers to the local display device;

overwriting a second one of the display buffers with first image data according to at least one frame composition command received from a remote host and containing at least one altered region between a successive pair of frames, wherein the first image data represent data of altered pixels in the at least one altered region;

obtaining a bit-map mask according to the at least one frame composition command received from the remote host and containing the at least one altered region between the successive pair of frames; and then overwriting the second one of the display buffers with second image data from the display buffers other than the second one of the display buffers according to a combination result of at least one bit-map mask associated with at least one successive pair of frames;

wherein the first image data are different from the second image data.

2. The method according to claim 1, further comprising:

rendering the first image data into at least one source buffer before the step of overwriting the second one of the display buffers with the first image data;

wherein the step of overwriting the second one of the display buffers with the first image data comprises:

overwriting the second one of the display buffers with the first image data from the at least one source buffer according to the at least one frame composition command received from the remote host and containing the at least one altered region between the successive pair of frames.

3. The method according to claim 1, wherein the first one of the display buffers is set as a front buffer and the other display buffers are set as back buffers, further comprising:

setting the second one of the display buffers as the front buffer and the first one of the display buffers as one of the back buffers according to a display timing signal after the step of overwriting the second one of the display buffers with the second image data.

4. The method according to claim 3, wherein the display timing signal is a vertical synchronization (VS) signal from the local display device.

5. The method according to claim 3, wherein the display timing signal contains a number of already transferred scan lines from the front buffer to the local display device.

6. The method according to claim 1, wherein the step of overwriting the second one of the display buffers with the second image data comprises:

overwriting the second one of the display buffers with the second image data from the first one of the display buffers according to a current bit-map mask.

7. The method according to claim 6, wherein the current bit-map mask indicates altered pixels and unaltered pixels in a current frame compared to an immediately previous frame, and wherein the second image data comprise pixel values of the unaltered pixels in the current frame compared to the immediately previous frame.

8. The method according to claim 1, wherein the step of overwriting the second one of the display buffers with the second image data further comprises:

overwriting the second one of the display buffers with the second image data from the first one of the display buffers according to a combination result of a current bit-map mask and a previous bit-map mask.

9. The method according to claim 8, wherein the current bit-map mask indicates altered pixels and unaltered pixels in a current frame compared to an immediately previous frame, wherein the previous bit-map mask indicates altered pixels and unaltered pixels in the immediately previous frame compared to a second previous frame, wherein the second image data comprise pixel values of specified pixels in the current frame, and wherein the specified pixels are unaltered in the current frame, but altered at the same positions in the immediately previous frame.

10. The method according to claim 1, wherein the step of overwriting the second one of the display buffers with the second image data comprises:

overwriting the second one of the display buffers with the second image data from two of the other display buffers according to a combination result of a current bit-map mask, a first immediately previous bit-map mask and a second immediately previous bit-map mask.

11. The method according to claim 10, wherein the current bit-map mask indicates altered pixels and unaltered pixels in a current frame compared to a first immediately previous frame, wherein the first immediately previous bit-map mask indicates altered pixels and unaltered pixels in the first immediately previous frame compared to a second immediately previous frame, wherein the second immediately previous bit-map mask indicates altered pixels and unaltered pixels in the second immediately previous frame compared to a third immediately previous frame, wherein the second image data comprise pixel values of first pixels in the first immediately previous frame and second pixels in the second immediately previous frame, wherein the first pixels are altered in the first immediately previous frame and unaltered at the same positions in the current frame, and wherein the second pixels are altered in the second immediately previous frame and unaltered at the same positions in the current frame and the first immediately previous frame.

12. An apparatus for displaying images, applied to an image decoding and display system comprising a local display device, the apparatus comprising:

a plurality of display buffers for storing image data;

a display unit for transferring a content of a first one of the display buffers to the local display device;

an update unit for overwriting a second one of the display buffers with first image data according to at least one frame composition command received from a remote host and containing at least one altered region between a successive pair of frames, wherein the first image data represent data of altered pixels in the at least one altered region;

a mask generation unit for generating a bit-map mask according to the at least one frame composition command received from the remote host and containing at least one altered region between the successive pair of frames;

a display compensate unit for overwriting the second one of the display buffers with second image data from the display buffers other than the second one of the display buffers according to a combination result of at least one bit-map mask associated with at least one successive pair of frames; and a display control unit for causing the display unit to transfer the content of the first one of the display buffers to the local display device;

wherein the first image data are different from the second image data.

13. The apparatus according to claim 12, further comprising:

a source buffer coupled to the update unit for storing the first image data; and a rendering engine coupled to the display control unit for rendering the first image data into the source buffer and generating a first status signal.

14. The apparatus according to claim 13, wherein the display compensate unit further generates a second status signal indicating whether writing of the display compensate unit is completed.

15. The apparatus according to claim 14, wherein the mask generation unit further generates a third status signal indicating whether the bit-map mask is completed, wherein the first one of the display buffers is set as a front buffer and the other display buffers are set as back buffers, and wherein the display control unit causes the display unit to transfer the content of the second one of the display buffers to the local display device according to a display timing signal, the first status signal, the second status signal and the third status signal.

16. The apparatus according to claim 15, wherein the display timing signal is a vertical synchronization (VS) signal from the local display device.

17. The apparatus according to claim 15, wherein the display timing signal contains a number of already transferred scan lines from the front buffer to the local display device.

18. The apparatus according to claim 12, wherein the display compensate unit overwrites the second one of the display buffers with the second image data from the first one of the display buffers according to a current bit-map mask.

19. The apparatus according to claim 18, wherein the current bit-map mask indicates altered pixels and unaltered pixels in a current frame compared to an immediately previous frame, and wherein the second image data comprise pixel values of the unaltered pixels in the current frame compared to the immediately previous frame.

20. The apparatus according to claim 12, wherein the display compensate unit overwrites the second one of the display buffers with the second image data from the first one of the display buffers according to a combination result of a current bit-map mask and a previous bit-map mask.

21. The apparatus according to claim 20, wherein the current bit-map mask indicates altered pixels and unaltered pixels in a current frame compared to an immediately previous frame, wherein the previous bit-map mask indicates altered pixels and unaltered pixels in the immediately previous frame compared to a second previous frame, wherein the second image data comprise pixel values of specified pixels in the current frame, and wherein the specified pixels are unaltered in the current frame, but altered at the same positions in the immediately previous frame.

22. The apparatus according to claim 12, wherein the display compensate unit overwrites the second one of the display buffers with the second image data from two of the other display buffers according to a combination result of a current bit-map mask, a first immediately previous bit-map mask and a second immediately previous bit-map mask.

23. The apparatus according to claim 22, wherein the current bit-map mask indicates altered pixels and unaltered pixels in a current frame compared to a first immediately previous frame, wherein the first immediately previous bit-map mask indicates altered pixels and unaltered pixels in the first immediately previous frame compared to a second immediately previous frame, wherein the second immediately previous bit-map mask indicates altered pixels and unaltered pixels in the second immediately previous frame compared to a third immediately previous frame, wherein the second image data comprise pixel values of first pixels in the first immediately previous frame and second pixels in the second immediately previous frame, wherein the first pixels are altered in the first immediately previous frame and unaltered at the same positions in the current frame, and wherein the second pixels are altered in the second immediately previous frame and unaltered at the same positions in the current frame and the first immediately previous frame.

* * * * *